CIRCUIT C, 302, 303 CLOSED
CIRCUIT D, 306, 307 CLOSED

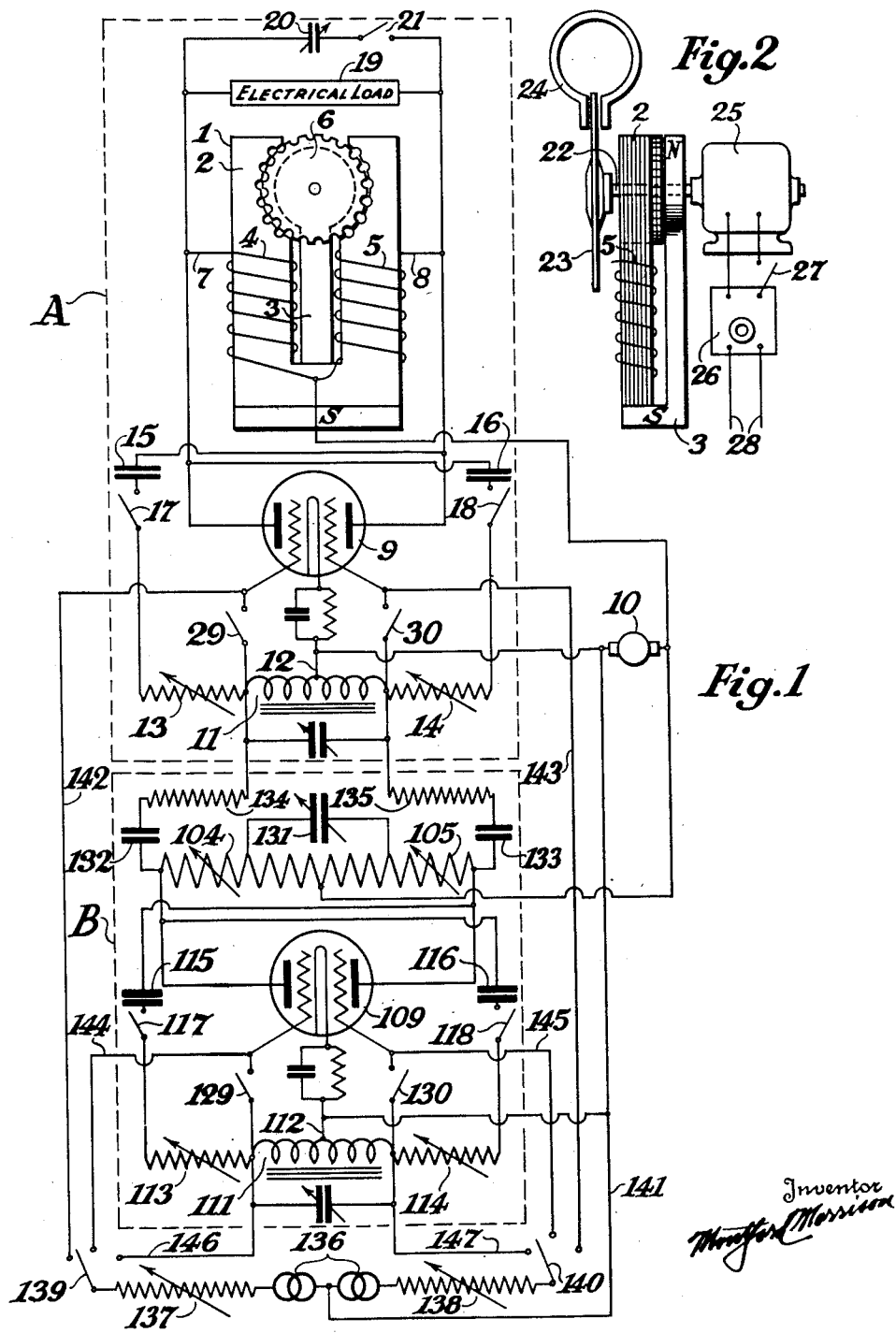

CIRCUIT E

CIRCUIT F
CIRCUIT G, 503, 504 CLOSED

Patented Feb. 23, 1954

2,670,437

UNITED STATES PATENT OFFICE 2,670,437

ELECTRONIC TUBE OSCILLATION SYSTEM

Montford Morrison, Rochester, N. Y.

Application January 10, 1948, Serial No. 1,595

8 Claims. (Cl. 250—36)

1

The present invention relates generally to electron discharge tube oscillators, in particular to such oscillators when frequency stabilized, and to electric motor devices embodying such said oscillators.

The present invention is in part a continuation of patent application Serial No. 599,891, filed June 16, 1945, which issued as Patent No. 2,443,691, June 22, 1948, and which was a continuation in part of application Serial No. 496,389, filed July 28, 1943, which issued as Patent No. 2,415,022, January 28, 1947.

When the invention is employed as an oscillator, among the objects thereof are: to provide a novel method of causing coupling feed-back to the oscillatory circuit in oscillators; to provide frequency stabilization with variation plate circuit characteristics in oscillators; and particularly to provide frequency stabilization with variation in oscillator loading. Further and other objects, when the invention is employed as an oscillator, will be indicated and obvious to those skilled in the art, upon reading the specification in connection with the drawings hereof.

When the invention is employed as an electric motor device, among the objects thereof are: to provide an electric motor device having a predetermined speed which may be fixed with a very high degree of accuracy; to provide constancy in said speed with variation in the applied motor voltage; and particularly to provide constancy in said speed with variation in mechanical loading of the motor. Further and other objects, when the invention is employed as an electric motor device, will be indicated and obvious to those skilled in the art.

The nature of the invention resides importantly in the employment of two different oscillatory systems combined in tandem producing a single frequency or producing a single speed in a motor. One of said oscillatory systems is set to oscillate, as an uncombined oscillator, at a frequency lower than the resonant frequency of its parallel oscillatory system, and the other of said oscillatory systems is set to oscillate, as an uncombined oscillator, at a frequency higher than the resonant frequency of its parallel oscillatory system, and the resultant combined operation being obviously at a frequency at which the two oscillators operate in tandem. The resulting combined structure provides the objects set forth above.

It is believed that in order to give a full, clear and exact description of the invention, it will be necessary to provide a fuller, clearer and more

2 exact theory of oscillator operation, as applied to the present invention, than is known to the applicant in published texts. The applicant will provide herein such extra-conventional theory as is thought to be pertinent.

The invention will be more fully understood from the following description and extra-conventional theory, when read in connection with the accompanying drawings, of which:

Fig. 1 is a circuit diagram of one embodiment of the invention in a simple form for clearness in explaining the basic structural principles of the invention;

Fig. 2 is a side view illustrating some detail of the type of motor mechanism employed in the embodiment described herein, and shows an eddy current disk and its magnet both being added to the element illustrated in the elevation shown in Fig. 1;

Figure 3:
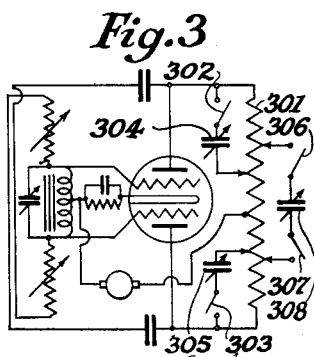
Fig. 3 shows a particular oscillator operating under condensive loading and Figs. 4 and 5, are other oscillator circuits which are used in illustrating the extra-conventional theory given herein.

Referring to Fig. 1, 1 is an alternating current motor which may be, in practice, any one of the many types which can be made to operate synchronously with an applied alternating voltage. The motor may be of the inductor type with salient poles, a direct current field type with a wound rotor having no salient poles, it may be of the phonic wheel type, or any other suitable substitution.

In the embodiment shown in Fig. 1, there is employed an inductor type motor with permanent magnetic fields and of a type commonly used as a synchronous motor and as an alternating current generator.

The stator member 2, Figs. 1 and 2, is of a laminated structure and has a permanent magnet member 3, which provides a constant magnetic field for the motor. The teeth of the stator are so spaced angularly with reference to the teeth of the rotor 6, that the main magnetic circuit provided by the magnet 3, is first through coil 5 and then through coil 4, as the rotor 6 revolves, and thus an alternating current is produced between terminals 7 and 8.

The operation as described above is really that of a generator, but of course, when alternating current is fed through windings 4 and 5, under proper conditions, the device will act as a motor.

Referring to Fig. 2, 23 is an eddy current disk fixed to motor shaft 22, and 24 is a magnet for disk 23, constituting a loading device for motor 1, in the form of the well known eddy current brake.

Fig. 2, 25 is a variable speed motor having a speed regulator 26 and being connectable through switch 27 to regulator 26 and therefore to line 28.

The simplified illustration shown in Fig. 2 forms a motor-generator set with mechanical loading and will be understood by those familiar with the art to which the present invention appertains.

In the prior art it has been common practice to supply motor 1, with alternating current amplified up to motor requirements from an electrically driven tuning fork. Under these conditions a high constancy of speed control can be obtained but only at a very high apparatus cost and with an excessive amount of weight. Further, under such conditions of operation, the motor has, like all synchronous motors, a distinct tendency to hunt, and while the mean speed may have a high precision of constancy, the instantaneous speed may, and often does, vary badly, thus making such a device unsuitable for certain fields of precise work where a complete absence of hunting and/or low apparatus cost is essential.

In Patent No. 2,415,022, the applicant disclosed a motor device which has a low apparatus cost, is entirely free from hunting and which may be firmly synchronized with minute injections of alternating current at, or near, the operating frequency. However motor devices constructed on the teachings of the above patent, when unsynchronized with a stable source of alternating current, sometimes, require a constant loading to operate at the highest constancy of speed, that is, under certain conditions of loading, the motor speed may change as much as a few tenths of one percent.

In the present device when operating unsynchronized, the speed of the motor and hence the frequency of the oscillator is entirely independent of mechanical and electrical loading, within the limit of breakdown torque of the motor, and the frequency of the system is the same for the motor stalled as for the motor running.

Also with the motor stalled and the system operating purely as an oscillator, the frequency of the system is independent of any reasonable electrical loading, resistive, inductive or condensive.

Such a result in a direct current motor or in an electronic tube oscillatory system, has not been discovered by the applicant in the prior art and is therefore considered by him as broadly new.

Further in the present system, the minimum requirement of synchronizing energy for firmly locking in the motor with an outside source of energy, under the conditions of operation, are not certain. However indications are that in a two stage system, an injected energy of the order of one millionth of the energy in the motor coils is sufficient and probably more than is necessary for good synchronization. Obviously the motor coils become the oscillator output coils when the system is employed as an oscillator.

Such a ratio as one million to one has not been approached by any two stage amplification system found in the prior art by the applicant.

Referring back to Fig. 1, the winding of electric motor 1, is connected push-pull to the output of twin triodes 9, provided with a source 10, of plate supply voltage. The grids of twin triodes 9 are connected across a capacitance-inductance parallel oscillatory system 11, the center 12 of which is connected with the cathodes of twin triodes 9.

The oscillatory system 11 is connected through feed-back variable resistors 13 and 14 and through capacitors 15 and 16, when switches 17 and 18 are closed, to the plates of twin triodes 9, which are connected push-pull to the windings 4 and 5.

Coils 4 and 5 may be shunted by an electrical load 19, and may be further shunted by a variable capacitor 20, by closing switch 21.

Switches 29 and 30 are provided to connect and to disconnect the grids of twin triodes 9 to and from the oscillatory system 11 and to and from feed-back through resistors 13 and 14.

The entire circuit enclosed within dotted area A, is essentially that shown in the above patent and may be referred to as a "retarded-oscillator" or simply as oscillator A.

Within the dotted area B is a second complete oscillator which may be referred to as an "advanced-oscillator," or simply as oscillator B.

Oscillator B has two variable plate resistors 104 and 105 connected push-pull to the output of twin triodes 109, also provided with plate power supply from source 10. The grids of twin triodes 109, may be connected across parallel oscillatory system 111, by closing switches 129 and 130. The center 112 of oscillatory system 111 is connected with the cathodes of twin triodes 109.

The oscillatory system 111 is connected through feed-back variable resistors 113 and 114 and through capacitors 115 and 116, when switches 117 and 118 are closed, to the plates of twin triodes 109, which are connected push-pull to the plate resistors 104 and 105.

Plate resistors 104 and 105 may be fully or partially shunted by variable capacitor 131.

The output of oscillator B is resistance coupled to the oscillatory system 11, of oscillator B, through capacitors 132 and 133 and through resistors 134 and 135.

A center tapped external source of alternating current 136 is provided with current limiting variable resistors 137 and 138 and switches 139 and 140. The center of source 136 is connected by lead 141 to both oscillators at their "ground potential" points.

Alternating current source 136 may be connected to the grids of twin triodes 9 through leads 142 and 143, by means of switches 139 and 140; said source may be connected to the grids of twin triodes 109 through leads 144 and 145, by means of switches 139 and 140; and said source may be connected to the oscillatory system 111, through leads 146 and 147, by means of switches 139 and 140.

It is believed that before the description of the operation of the invention is entered into it will be necessary to define certain terms as used herein and present some extra-conventional oscillator theory essential to a full understanding of the invention.

The following definitions establish the meanings of certain terms as used herein.

To tune a circuit means to set the LC of a circuit such that the line voltage and line current are in phase.

In resonance may mean in phase or 180° out of phase depending upon the circuit referred to.

To set an oscillatory circuit means to fix the LC of the circuit to give the desired result. The set LC may correspond to a value above, at, or below, the resonance frequency of the circuit.

The natural period of the circuit often referred to as the proper period at which an oscillator should work, is the period of pure exoenergic operation of the circuit and has no direct bearing on the endoenergic operation thereof, as will be shown hereinafter.

Exoenergic is the applicant's short term for the expression, "Under conditions in which stored energy in the circuit is being given up." The word obviously corresponds to exothermic as used in describing chemical reactions.

Endoenergic is the applicant's short term for the expression, "Under conditions in which energy is being supplied to the circuit." The word obviously corresponds to endothermic as used in describing chemical reactions.

Endoenergic operation of any oscillatory system is commonly referred to as operation under forced oscillation, when the energy supplied is of the same periodic character as the oscillations forced.

However impulse driven oscillators are under endoenergic operation for the duration of the impulse and under exoenergic operation during the absence of the impulse.

Forced oscillators providing output energy are under both endoenergic and exoenergic operation.

Fig. 3 shows a push-pull oscillator having a resistance stabilized feed-back; the plate circuit has a center tapped resistor 301, one set of switches 302 and 303 for introducing parallel variable capacitors 304 and 305 across the ends of resistor 301, and a second set of switches 306 and 307 for introducing parallel variable capacitor 308 across the central position of resistor 301. When switches 306 and 307 are open and switches 302 and 303 are closed the diagram will be referred to as circuit C. When switches 306 and 307 are closed and switches 302 and 303 are open the diagram will be referred to as circuit D.

Figure 4:
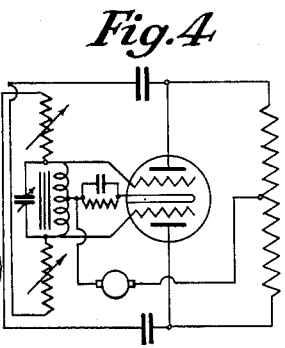

Fig. 4 shows a push-pull oscillator having a resistance stabilized feed-back and pure resistive loading in the plate circuits. The diagram of this figure will be referred to as circuit E.

Figure 5:
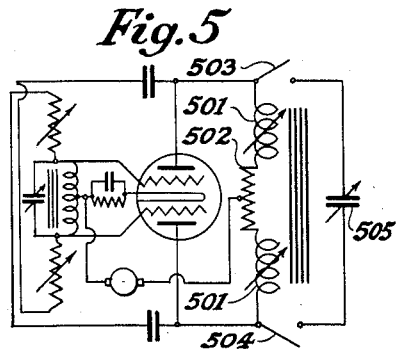

Fig. 5 shows a push-pull oscillator having a resistance stabilized feed-back; the plate circuit has a split inductor 501 with a center tapped resistor 502 inserted between the split coils. This part of the diagram will be referred to as circuit F. The figure also has a set of switches 503 and 504 for introducing parallel variable capacitor 505 across said split inductor; with switches 503 and 504 closed the figure will be referred to as circuit G.

The details of Figs. 6, 7 and 8 will be discussed under the operation of Figs. 3, 4 and 5, but before these operations are taken up, it is necessary to establish and define certain factors which enter into said operations, and which are explained in connection with Fig. 9.

Figure 9:
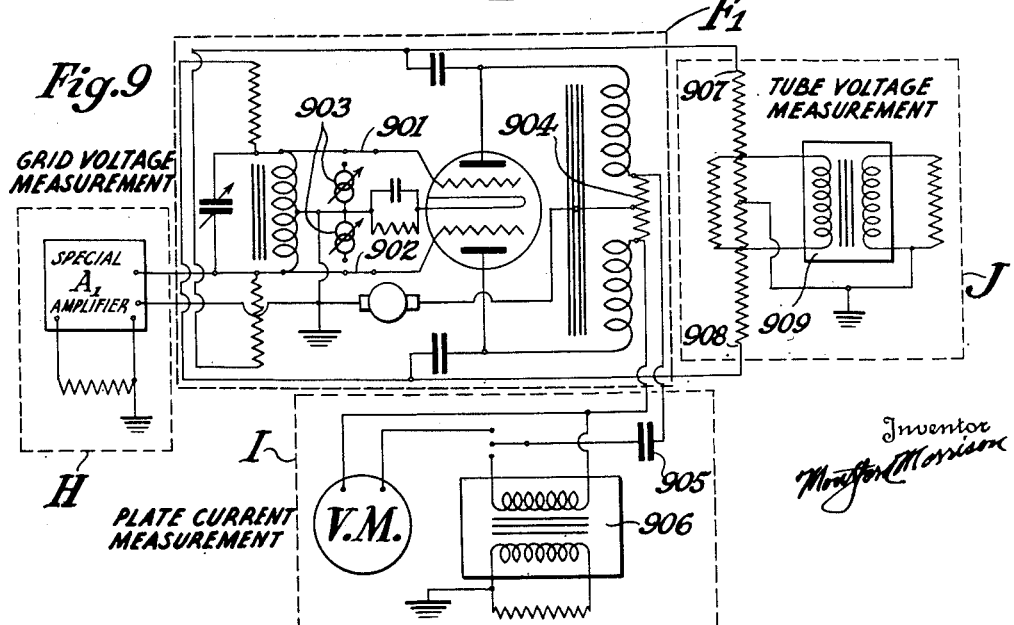
Fig. 9 is a diagram illustrating the methods of making tests which define certain terms used in the extra-conventional theory presented herein.

In Fig. 9, the part of the diagram which lies entirely within the dotted area $F_1$, constitutes a circuit identical with F, and while other circuits may be substituted in its place, the illustrated circuit suffices for purposes of illustration. The circuit $F_1$ of the figure is provided with a set of switches 901 and 902, which may be thrown to disconnect the grids of the triodes from the oscillatory system and connect the grids to a variable frequency center tapped source of variable alternating current 903. The figure shows and defines three methods of measurement which will be referred to hereinafter, namely:

Grid voltage measurement, which is employed to measure voltage values and phase positions, under conditions in which no line current and no appreciable line "de-setting" is permissible. This method is also used for obtaining the phase angle between the voltage and the current in a parallel oscillatory system, under similar conditions. The device within dotted area H is a special $A_1$ amplifier which is constructed to have negligible phase difference between the input and output voltages for the frequencies employed, but without any necessarily high amplification. Such an amplifier may be constructed like a resistance coupled output design, but with the coupling capacitor having a relatively large capacity and the output resistor having an ohmic value relatively very high to that of the plate resistor. Phase difference between the input and output can be tested by means of an "electronic switch" and a cathode ray oscilloscope.

Plate current measurements (the alternating current component thereof) are made by what may be called a "resistance drop" method. Referring to Fig. 9, the center tapped resistor 904 is a highly accurate non-inductive resistor which is left permanently in the circuit and has sufficient resistance to give a usable reading on high-resistance voltmeter V. M. The voltmeter resistance should be of the order of 100 times that of the resistor. Any direct current present in the resistor is prevented from entering the plate current measurement circuit by capacitor 905. The value of the current in the resistor is obviously determined by the voltmeter. For taking oscillograms and phase angle measurements of the current in resistor 904, an extremely high-fidelity interstage transformer 906, is employed having an input impedance of the order of 100 times that of resistor 904. This arrangement should be checked for phase difference, because all transformers sold as high-fidelity types may not have a zero phase difference between the input and output for the frequency used.

Tube voltage measurements (the alternating current component thereof) are made by a "resistance drop" method but across a small percentage of the total resistance used, and if the total resistance used effects the circuit constants, the shunt resistance is either left in the circuit or an equivalent resistance is substituted, so that the operation of the circuit without the measuring device is the same as when it is in use. Referring to the circuit within the dotted area J, the total resistance between points 907 and 908 may be of the order of 1,000,000 ohms, the effective resistance across the input of transformer 909, may be of the order of 10,000. Transformer 909 is preferably an extremely high-fidelity extremely small type such as go by such trade names as "ouncers," "inchers" and so forth, and should have an input impedance of the order of 1,000,000 ohms. These combinations should always be checked for phase difference. With 100 plate A. C. volts good oscillograph deflections are obtained through an electronic switch, with the values given. With the circuit as connected in Fig. 9, the measurements are those of the circuit as an oscillator. With switches 901 and 902 thrown to connect independent A. C. source 903, the measurements are made on an amplifier and obviously phase angle measurements can be made on various parts of the circuit at any desired frequency.

Certain experimental facts will be established on the operation of Figs. 3, 4 and 5, based upon measurements taken by the circuits explained in Fig. 9.

Referring to Fig. 4, if the voltage values and phase angle are taken of the parallel oscillatory circuit alone of circuit E, as a function of the applied frequency at a constant effective current, there is obtained the familiar resonance-voltage curve 701 and its phase angle curve 702, with reference to said current. If said oscillatory circuit is tuned to resonance at say X cycles independently and then put into circuit E, and the feed-back resistor properly adjusted, circuit E can be made to oscillate at X cycles or the resonant frequency of said oscillatory circuit.

Figure 8:
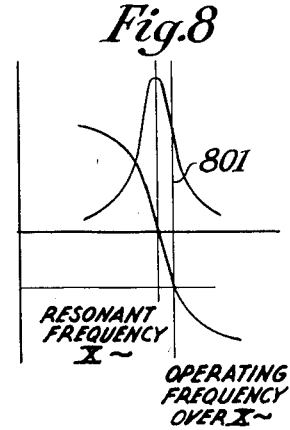

However if the same oscillatory circuit with its X cycle resonant tuning and with the same adjustment of feed-back resistors, is substituted in circuit F and the proper measurements made, it will be found that circuit F does not oscillate at X cycles, but at some higher frequency 801, Fig. 8, and with a lower output with the same plate impedance, because it will be found that the grid voltage is lower.

Then if switches 503 and 504 are closed with low capacity adjustment of capacitor 505, it will be found that by increasing said capacity the frequency and grid voltage can be brought to the values of circuit E. Further adjustments of said capacity will lower the grid voltage.

Figure 6:
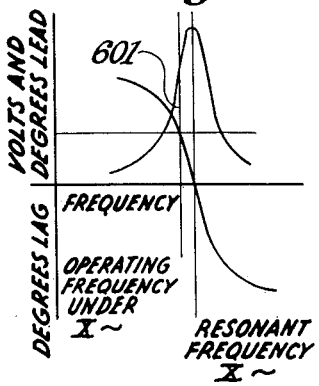
Figs. 6, 7 and 8 are graphs relating to the oscillators shown in Figs. 3, 4, and 5.
Figure 7:
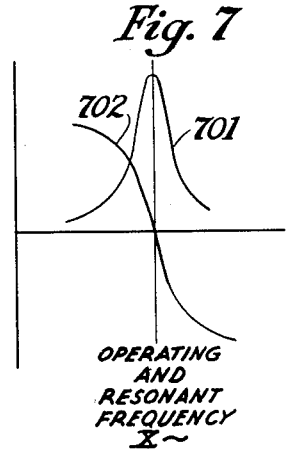

Now if the same oscillatory circuit with its X cycle resonant tuning and with the same adjustment of feed-back resistors is substituted in either circuit C or D, say in circuit D, it will be found that circuit D does not oscillate at X cycles, but at some lower frequency 601, Fig. 6, and with a lower output with the same plate impedance, because it will be found that the grid voltage is lower.

It will be found that other factors, like amount of feed-back resistance, Q of oscillatory circuit at the frequency and voltage employed, and other factors which are beyond the scope essential to this disclosure, effect the oscillator frequency. A fuller more comprehensive mathematical discussion is reserved for a still broader disclosure in a separate application.

From the above tests it is obvious that the circuits C, D, E, F and G, can be made to oscillate at the same frequency by employing different LC values in the parallel oscillatory circuits.

If the parallel oscillatory circuit of circuit F is set so that circuit F oscillates at say 600 cycles, it will be found that the oscillatory circuit voltage values and their phase relation to the tube voltage (oscillatory circuit current) as a function of the circuit frequency, is represented by Fig. 8, in which the frequency corresponding to the line 801, represents 600 cycles. Assume the phase lead shown to be, say 60°, which is a common value. This means that the grid voltage lags the tube voltage by 60° and that the oscillatory circuit is not operating at the resonant point, but in the steep region of the high-frequency side.

By increasing the inductance of coil 501, that is by increasing the phase angle between the A. C. tube current and the A. C. tube voltage, the line 801 moves to the right and the operating frequency is increased, and by decreasing the inductance of coil 501, the operating frequency is decreased.

If coils 501 represent the operating winding of a synchronous type alternating current motor, the motor speed changes with change in frequency. That is, if circuit F, just discussed, represents the circuit A, Fig. 1, we have the operation, just discussed, applied to motor, which to this point is the disclosure of the patent referred to above.

It is obvious from the above that this much of the motor disclosure is subject to speed variation with load, a characteristic of direct current motors. While in the motor just described the variation can be made small—a few tenths of one percent—it is, nevertheless, present.

As it has been indicated, circuits C, D and G, can be adjusted so that the grid voltage leads A. C. tube voltage at the operating frequency and say this frequency is 600 cycles and is represented by the line 601, Fig. 6. Obviously increasing the shunt capacity of these circuits, decreases the frequency thereof and decreasing the capacity increases the frequency, within proper operating limits.

Directions can now be given for completing the detailed structure and operation of Fig. 1. As an oscillator, the circuit is to operate, for example, at a frequency of 600 cycles and as a motor device the motor is to operate at 1800 R. P. M. with the number of poles shown in the figure.

First, the circuit in dotted area A is set up as shown in the area, with switches 17, 18, 29 and 30 open, and with circuit B out of operation. Source 136 is set to a frequency of 600 cycles and to a voltage which, through resistors 137 and 138, when switches 139 and 140 are closed upon leads 142 and 143, will produce the normal oscillator-operation grid-voltage at the grids of tube 9.

The motor 1 is brought up to above 1800 R. P. M. by closing switch 27 and adjusting regulator 26, Fig. 2. After well known circuit adjustments, then switch 27 can be opened and motor 1 will continue to run and at 1800 R. P. M. The phase angle between the A. C. motor current and the A. C. tube voltage is taken and recorded to be say 60°.

Switches 139 and 140 are opened and switches 17, 18, 29 and 30 are closed. Oscillatory circuit 11 and feed-back resistors are set to stable oscillator operation at 600 cycles with the motor operating (at 1800 R. P. M.), with some loading by eddy current disk 23 under suitable adjustment of magnet 24, Fig. 2.

Now oscillatory circuit 11, is set to a final position where the oscillator frequency and therefore the motor speed operate at a few tenths of one percent slow, that is under 600 cycles and under 1800 R. P. M., the best value has to be found by trial after complete adjustment of the entire system. The system is now operating in accordance with the data shown in Fig. 8.

Second, the circuit in dotted area B is set up as shown in the area with switches 117, 118, 129 and 130 open. Switches 139 and 140 are closed upon leads 146 and 147 and with source 136 operating at 600 cycles and at a suitable voltage, oscillatory circuit 111 is set so that the voltage thereof leads the line current (which will be tube voltage in the oscillator) by something of the magnitude of 15° (in some cases considerably less suffices). Switches 139 and 140 are then opened and switches 117, 118, 129 and 130 are then closed with circuit A out of operation.

Capacitor 131 is then adjusted so that circuit B oscillates at a frequency a few tenths of one one percent faster than 600 cycles.

Circuits A and B are then put into simultaneous operation, and by final adjustment of feedback resistors 113 and 114, the combined frequency of the two systems can be brought to exactly the desired frequency, which in the example is 600 cycles and hence the motor to exactly 1800 R. P. M.

From the discussion of circuits C, D and F, it is obvious to those skilled in the art that these circuits and other circuits in the category of these, can be substituted for circuit B of Fig. 1, and I hereby disclosed such substitutions to be within the scope of the invention.

Under proper construction, setting and adjustments of the combined A and B circuits, the following are some of the operating characteristics which will be found present.

The motor speed is entirely independent of motor loading within the limits of the breakdown torque of the motor shaft.

The oscillation frequency is entirely independent of the output circuit loading, resistive, inductive or, capacitive, within operating limits; and in view of which, the frequency is independent of whether the motor is running or not.

The system is extremely sensitive to voltages, at or near the operating frequency, when injected into oscillatory circuit 111. With 3 volt-amperes in motor coils 4 and 5, 3 micro-volt-amperes injected into oscillatory circuit 111 is more than is required for locking the system into synchronism with source 136, by closing switches 139 and 140 upon leads 146 and 147. In a case in actual practice with switches 139 and 140 closed and 3-micro-volt-amperes being injected into oscillatory circuit 111, with the result of firm synchronization, one of said switches could be opened without destroying good synchronization, so that the lower limit is indicated as being below 3 micro-volt-amperes, or in other words the ratio of injected energy to the operating is greater than one to one million.

While directions have been given herein to retard the independent frequency of circuit B, a few tenths of one percent below the desired final operating frequency of the system and to advance the independent frequency of circuit A, a few tenths of one percent above the desired final operating frequency of the system, these values are given only as a set of operating conditions for a starting point of final adjustment. These as well as other important adjustments should be varied to find the values which give the best results under the conditions of desired operation.

In the above discussion of the operation of the circuit of Fig. 1 and its equivalent circuits, directions have been given for the "advanced oscillator" to be set at a frequency above normal operating frequency for the independent preliminary frequency value, by providing an arbitrary condensive plate load and setting the oscillatory system to cause the desired frequency. This procedure causes the oscillatory system to operate at a frequency below the resonant frequency thereof, as illustrated in Fig. 6.

However the application has found that in practical oscillators, one may start by setting the oscillatory system such that the normal operating frequency of the tandem system is below the resonant frequency (say a few percent) of the oscillatory system, and then it will be found that by adjustment of the feed-back resistors, the desired normal frequency can be obtained with or without condensive plate loading 131.

A common structural characteristic of the two systems or methods is obviously that the "advanced oscillator" operates with the "in tandem" frequency below the resonant frequency of its oscillatory system, and the "retarded oscillator" operates with the "in tandem" frequency above the resonant frequency of its oscillatory system.

A species of the invention embodying the last described structure, employing no condensive loading in the plate circuit, comprises circuit A with circuit E substituted for circuit B of Fig. 1, that is, tandem coupled circuits as shown in Fig. 1, with circuit A as an output circuit, but with circuit B eliminated and with circuit E in its place. This combination will be referred to as circuit A—E.

An experimental study of circuit A—E suggests an entirely different explanation of the theory of operation of the generic structure of the invention, and it is believed that this different theory of operation can be understood most readily by starting with circuits A and B as shown in Fig. 1, having been set to operate at say 600 cycles with the motor running at 1800 R. P. M., as directed in the first instance.

The feed-back circuit of circuit A is opened so that no feed-back current is supplied to the grid-circuit thereof. The plate circuit capacitance of circuit B is reduced to substantially zero, by which procedure circuit B becomes equivalent to circuit E, and will be referred to as circuit E. With these settings circuit E is an oscillator having its output "resistance-capacitance" coupled to the input of circuit A, which, under the conditions stated is operating as a special sort of an amplifier.

The oscillatory system of circuit E is set such that the voltage thereof leads the feed-back current by a few degrees, as a preliminary figure subject to optimum setting say to 15°, and then the feed-back resistances of oscillator circuit E are set to values which cause circuit E to oscillate at say 600 cycles and therefore amplifier and motor circuit A to operate at 600 cycles. The motor will run at 1800 R. P. M., if sufficient voltage is produced at its coil terminals. When the motor is running under these conditions it operates as a conventional synchronous motor and therefore has a decided tendency to "hunt."

The feed-back circuit of circuit E is now opened so that no feed-back current is supplied to the grid-circuit thereof, by which procedure circuit E is put out of operation, except for such coupling effect as its inactive circuits may have upon circuit A.

The feed-back circuit of oscillator circuit A is then closed and the feed-back resistances thereof are set to values which cause circuit A to oscillate at 600 cycles and the motor to run at 1800 R. P. M.

Circuit A now operates in accordance with the teaching of the above cited patent. The frequency of oscillation of circuit A and the speed of the motor thereof can be set to be substantially independent of normal line voltage variations, but the frequency of oscillation, and therefore the speed of the motor, are slightly subject to motor loading, both positive and negative.

In order to make it clear what is meant by positive loading and by negative loading, assume that the eddy current brake of Fig. 2, is eliminated and that the motor of circuit A is operating at normal speed. If the speed of variable speed motor of Fig. 2, is regulated to a speed below said normal speed, the motor of circuit A is partially driving the variable speed motor and may be said to be operating under positive loading or under positive torque. If the speed of variable speed motor of Fig. 2, is regulated to a speed above said normal speed, the motor of circuit A is partially driven by variable speed motor and may be said to be operating under negative loading or under negative torque.

Normally when circuit A is set to operate independently at normal speed under normal loading, the addition of positive torque causes it to run slightly slower, and the addition of negative torque causes it to run slightly faster. However adjustments can be made to obtain different effects than those described.

Now with circuit A set to operate at normal frequency and the motor thereof operating at normal speed, in accordance with direction given above and with circuit E coupled thereto and set to operate at normal frequency when its feed-back circuit is closed, said feed-back circuit is then closed and the tandem circuit operates at normal frequency and the motor operates at normal speed, if the directions have been properly carried out.

However it will be found that the frequency of the tandem circuit, and the speed of the motor, are not subject to variation with the addition of positive torque or with the addition of negative torque, within the break-down torque of the motor, and further, under usual preliminary adjustments the frequency of the tandem circuit, and the speed of the motor, tend to decrease with increase of line voltage and to increase with decrease of line voltage, rather than to go up and down with line voltage as is an outstanding characteristic of prior art oscillators and such motor devices.

While the setting and adjustment of circuit A can be made by those skilled in the art of audio-frequency resistance stabilized oscillators, some extra-conventional theory will be helpful in setting and adjusting circuit E, when it is employed to regulate circuit A.

In actual oscillators of the type represented by circuit E, the generated frequency depends importantly upon three factors—setting of the grid oscillatory circuit, the amount of feed-back current and the plate voltage. With the grid oscillatory circuit set for resonance at or near the proper operating frequency of the oscillator, the generated frequency varies inversely with the amount of feed-back current and inversely with the plate voltage.

Of the various embodiments of the invention so far constructed, best results have been obtained with the oscillation in the B circuit position, having its oscillatory element set for resonance at a frequency which will cause the grid voltage to lead the tube voltage by an angle of the order of about 15°. Different values may be more satisfactory for different embodiments.

It will now be seen that the frequency of oscillator of circuit A varies with the plate voltage, and that oscillator of circuit E (also of circuits C and D) varies inversely with the plate voltage, so that the variation of plate voltage (line voltage variation) in one oscillator offsets the variation in the other oscillator, which constitutes frequency stabilization against the line voltage variation.

Returning to Fig. 1 under the operating condition that the feed-back circuit of circuit A is open and the tandem circuits are operating as oscillator circuit E driving circuit A as an amplifier. If the phase positions of the tube voltage in circuits E and A are taken, it will be found as to be expected that they are 180° apart. If, however, the feed-back circuit of circuit A is closed, it will be found that the phase position of the tube voltage of circuit A is pushed ahead by the output voltage of circuit E, and that proper operation of the tandem circuit is present when the two tubes voltages are out of phase by an angle less than 180°.

In view of the above discussion the operation of the tandem circuit is also explained by the vector combinations of the two circuits reacting one upon the other, instead of from the "push-pull" frequency standpoint. However, the two apparently different physical explanations can be shown to be mathematically equivalent.

It is believed that the directions given herein are in such clear and exact terms as will enable those skilled in the art to make and use devices embodying the spirit of the invention, and that a much greater amount of detail would destroy the conciseness required by the Rules of Practice, however some detail will be pointed out.

The circuits A and B are connected in tandem with circuit A being set to push ahead, if and when circuit B tends to lag behind the predetermined frequency and speed, and circuit A tends to withdrawal its normal contribution of energy to circuit B, if and when circuit B tends to advance in frequency beyond the predetermined frequency and speed, which of course is in fact an effect of circuit A holding back circuit B from advancing in frequency. Other explanations of the operation can be given but it is believed that this one suffices for patent specification purposes.

The stability of the system in the presence of varying load is importantly caused by the feed-back current from circuit A entering into the oscillatory circuit 111 of circuit B. Feed-back current is, what its name implies, opposite in phase to the forward current in the circuit. As shown in Figs. 6 and 8, the grid voltage of oscillatory circuit 111 leads the grid voltage of oscillatory circuit 11, but not enough to have a reversed phase position, that is, they are mostly positive at the same time, but the feed-back voltage from circuit A, when it flows through oscillatory circuit 111, is mostly negative when the feed-back voltage from circuit B is positive, so that the feed-back current from circuit A is substracted (vectorially) from the feed-back current from circuit B, when both currents flow through oscillatory circuit 111. This means that if the feed-back current, from circuit A in oscillatory circuit 111 weakens, the resultant current therein is strengthened and circuit B takes more control of the system with an increased forward coupled feed into circuit A. If circuit B tends to run at a lower frequency the phase difference in the feed-back current (vector difference) increases the forward coupling current from circuit B into oscillatory circuit 11, pulling it up to the set frequency.

The above constitutes specific embodiments of the invention and the broader scope of the invention is pointed out with more particularity in the claims hereunder.

I claim:
1. In an electrical oscillation system, a first grid controlled electron discharge tube oscillator having in the plate circuit thereof a load subject to variation, said oscillator having a given fundamental isolation-operation frequency subject to variation with variation in said load, a second grid controlled electron discharge tube oscillator coupled to said first oscillator, said second oscillator having an isolation-operation frequency differing from said fundamental frequency by an amount greater than zero and substantially less than the difference between said fundamental frequency and a second harmonic thereof, and second said oscillator having a frequency regulation characteristic set to compensate frequency variation in first said oscillator due to variation in said load.

2. In an electrical oscillation system set to operate at a normal frequency under changing load, a first grid controlled electron discharge tube oscillator having in the plate circuit thereof a load subject to change, said oscillator having a frequency subject to change with change in said load, a second grid controlled electron discharge tube oscillator set to operate when isolated at frequency substantially less than twice said normal frequency, said second oscillator coupled to first said oscillator and said second oscillator having a frequency-change characteristic opposing frequency-changes in first said oscillator.

3. In an electrical oscillation system operating at a normal frequency, two grid controlled electron discharge tube oscillators, one of said oscillators having an effectively inductive plate load, said one oscillator having an uncoupled frequency set below said normal frequency, the other of said oscillators having an effectively capacitive load, said other oscillator having an uncoupled frequency set above said normal frequency, the difference between said frequency settings being substantially less than the difference between either of said frequencies and a second harmonic thereof, and two said oscillators coupled in tandem operating at said normal frequency.

4. An electrical oscillation system comprising a load circuit having a frequency determined by the combined operation of two grid controlled electron discharge tube oscillators operating in tandem, each of said oscillators having an oscillatory element in the grid circuit thereof, each of said elements being tuned to a different isolation-operation frequency, one of said oscillators including said load circuit, said load circuit having a circuit supplying feed-back current to the other of said oscillators, the element of said other oscillator being set to reflect said feed-back current back to said one oscillator through its oscillatory element at a phase angle opposing frequency shift in said oscillator, and both said oscillators being set at isolation-operation frequencies having a difference greater than zero and substantially less than the difference between either frequency and a second harmonic thereof.

5. In an electrical oscillation system having a terminal output circuit, two grid controlled electron discharge tube oscillators connected in tandem, each of said oscillators having a plate output circuit and an oscillatory element in the grid circuits thereof, the oscillatory element of one of said oscillators being set to operate at a frequency lower than the resonant frequency of said element, the oscillatory element of the other of said oscillators being set to operate at a frequency higher than the resonant frequency of said element, the plate-output circuit of said one oscillator constituting said terminal output circuit, and the oscillatory element of said one oscillator constituting the plate-output circuit of said other oscillator.

6. In an electrical oscillation system having a terminal load, a first grid controlled electron discharge tube oscillator the output load of which constitutes said terminal load and the grid circuit of which includes an oscillatory element, said oscillatory element being set to operate at a first frequency, a second grid controlled electron discharge tube oscillator the output load of which includes said oscillatory element and the grid circuit of which includes a second oscillatory element, said second oscillatory element being set at a second frequency different from said first frequency, said two frequencies having a difference less than the ratio of 1 to 2, and said oscillators operating in tandem electrically coupled relation.

7. In an electrical oscillation system, two grid controlled electron discharge tube oscillators coupled in tandem, one of said oscillators having an inductive plate load, the other of said oscillators having a capacitive plate load, each of said oscillators having an oscillatory element in the grid control circuit thereof, said elements having different resonance frequencies, said frequencies differing by an amount greater than zero and substantially less than the difference between either one of said frequencies and a second harmonic thereof, and said system set to operate at a single oscillation frequency.

8. In an electrical oscillation system, two grid controlled electron discharge tube oscillators coupled in tandem, one of said oscillators connected to supply output current for said system, the other of said oscillators connected to supply input current to first said oscillator, each of said oscillators having oscillatory elements in the grid circuits thereof, said one oscillator having an inductive plate load, said other oscillator having a capacitive plate load, said oscillators being set when isolated to operate at different frequencies, said frequencies differing by an amount greater than zero and substantially less than the difference between either one of said frequencies and a second harmonic thereof, and said two oscillators having an electrical coupling causing system operation at a single frequency.

MONTFORD MORRISON.

References Cited in the file of this patent

UNITED STATES PATENTS

| Number | Name | Date |
|---|---|---|
| 1,580,536 | Rosenbaum | Apr. 13, 1926 |
| 1,925,520 | Buschbeck | Sept. 5, 1933 |
| 2,098,386 | Hansell | Nov. 9, 1937 |
| 2,149,756 | Arenberg et al. | Apr. 7, 1939 |
| 2,228,323 | Mortley | Jan. 14, 1941 |
| 2,248,481 | Schuttig | July 8, 1941 |
| 2,284,372 | Crosby | May 26, 1942 |
| 2,305,262 | Lange | Dec. 15, 1942 |
| 2,344,813 | Goldstine | Mar. 21, 1944 |
| 2,407,213 | Tunick | Sept. 3, 1946 |
| 2,423,103 | Koechlin | July 1, 1947 |
| 2,438,382 | Born | Mar. 23, 1948 |
| 2,445,933 | Beste | July 27, 1948 |

FOREIGN PATENTS

| Number | Country | Date |
|---|---|---|
| 460,693 | Great Britain | Feb. 2, 1937 |